(12) United States Patent
Shniberg et al.

(10) Patent No.: US 6,801,245 B2
(45) Date of Patent: Oct. 5, 2004

(54) METHOD FOR AUTOMATIC IDENTIFICATION AND DATA CAPTURE

(75) Inventors: Moti Shniberg, Elkannah (IL); Yaron Nemet, Kedumim (IL); Erez Sali, Savion (IL)

(73) Assignee: Imageid Ltd., Rosh Ha'ayin (IL)

( * ) Notice: Subject to any disclaimer, the term of this patent is extended or adjusted under 35 U.S.C. 154(b) by 97 days.

(21) Appl. No.: 10/052,427

(22) Filed: Jan. 18, 2002

(65) Prior Publication Data

US 2003/0136833 A1 Jul. 24, 2003

(51) Int. Cl.[7] .............................................. H04N 5/225
(52) U.S. Cl. ................. 348/169; 340/5.92; 235/385; 235/469; 235/494
(58) Field of Search .......................... 340/572.1, 572.4, 340/573.1, 521, 522, 691.6, 5.92; 705/22, 28; 235/385, 487, 494, 454, 469, 462.01, 462.03, 462.04, 462.11, 462.41; 348/86, 91, 94, 96, 161, 169, 195; 250/555, 559.07, 559.08; 382/181, 224, 100, 141, 103

(56) References Cited

U.S. PATENT DOCUMENTS

| | | | | |
|---|---|---|---|---|
| 3,636,317 A | * | 1/1972 | Torrey | 235/494 |
| 3,646,264 A | * | 2/1972 | Waugh | 348/169 |
| 3,959,629 A | * | 5/1976 | Specht et al. | 235/487 |
| 4,044,227 A | | 8/1977 | Holm et al. | 235/437 |
| 4,268,179 A | | 5/1981 | Long et al. | 400/118.2 |
| 4,345,274 A | * | 8/1982 | Bambara | 348/148 |
| 4,794,238 A | | 12/1988 | Hampton | 235/462.32 |
| 4,844,509 A | | 7/1989 | Kasprzak et al. | 283/81 |
| 4,858,000 A | | 8/1989 | Lu | 725/12 |
| 4,924,088 A | * | 5/1990 | Carman et al. | 235/464 X |
| 5,113,349 A | * | 5/1992 | Nakamura et al. | 700/215 |
| 5,468,949 A | | 11/1995 | Swart et al. | 235/472.01 |
| 5,539,394 A | * | 7/1996 | Cato et al. | 340/10.32 |

(List continued on next page.)

FOREIGN PATENT DOCUMENTS

WO   WO 00/04711   1/2000

Primary Examiner—Thomas J. Mullen, Jr.
(74) Attorney, Agent, or Firm—AlphaPatent Associates Ltd.; Daniel J. Swirsky

(57) ABSTRACT

A system and methodology for tracking objects including affixing at least one imagable identifier onto each of a multiplicity of objects to be tracked, imaging at least a portion of at least one of the multiplicity of objects at a known location to provide an at least partial image of the at least one of the multiplicity of objects, containing the at least one imagable identifier and employing the at least partial image of the object containing the at least one imagable identifier to provide an output indication of the location of the at least one of the multiplicity of objects.

72 Claims, 4 Drawing Sheets

U.S. PATENT DOCUMENTS

| | | | |
|---|---|---|---|
| 5,565,858 A * | 10/1996 | Guthrie | 340/10.33 |
| 5,587,906 A | 12/1996 | McIver et al. | 701/36 |
| 5,600,121 A | 2/1997 | Kahn et al. | 235/462.48 |
| 5,621,864 A | 4/1997 | Benade et al. | 358/1.18 |
| 5,698,833 A * | 12/1997 | Skinger | 235/462.09 |
| 5,708,470 A * | 1/1998 | Holford | 348/61 |
| 5,780,826 A * | 7/1998 | Hareyama et al. | 235/385 |
| 5,825,012 A | 10/1998 | Rockstein et al. | 235/472.01 |
| 5,828,048 A | 10/1998 | Rockstein et al. | 235/462.01 |
| 5,828,049 A | 10/1998 | Knowles et al. | 235/462.01 |
| 5,914,477 A * | 6/1999 | Wang | 235/462.1 |
| 5,963,134 A * | 10/1999 | Bowers et al. | 340/572.1 |
| 5,988,508 A | 11/1999 | Bridgelall et al. | 235/462.4 |
| 5,996,895 A | 12/1999 | Himan et al. | 235/472.01 |
| 6,023,530 A | 2/2000 | Wilson | 382/219 |
| 6,070,801 A | 6/2000 | Watanabe et al. | 235/462.16 |
| 6,076,023 A * | 6/2000 | Sato | 700/214 |
| 6,088,482 A * | 7/2000 | He et al. | 235/494 X |
| 6,127,928 A | 10/2000 | Issacman et al. | 340/572.1 |
| 6,142,375 A * | 11/2000 | Belka et al. | 235/454 |
| 6,164,541 A | 12/2000 | Dougherty et al. | 235/462.01 |
| 6,206,286 B1 | 3/2001 | Watanabe et al. | 235/462.01 |
| 6,252,508 B1 | 6/2001 | Vega et al. | 340/572.1 |
| 6,259,408 B1 | 7/2001 | Brady et al. | 343/700 MS |
| 6,265,977 B1 | 7/2001 | Vega et al. | 340/572.7 |
| 6,283,375 B1 | 9/2001 | Wilz, Sr. et al. | 235/462.45 |
| 6,285,342 B1 | 9/2001 | Brady et al. | 343/895 |
| 6,286,763 B1 | 9/2001 | Reynolds et al. | 235/472.01 |
| 6,317,044 B1 | 11/2001 | Maloney | 340/568.1 |
| 6,342,830 B1 | 1/2002 | Want et al. | |
| 6,418,235 B1 | 7/2002 | Morimoto et al. | 382/118 |
| 6,496,806 B1 * | 12/2002 | Horwitz et al. | 705/28 |
| 6,526,158 B1 | 2/2003 | Goldberg | 382/115 |
| 6,531,675 B2 * | 3/2003 | Faitel | 219/121.63 |
| 6,600,418 B2 * | 7/2003 | Francis et al. | 340/572.1 |
| 2003/0118216 A1 * | 6/2003 | Goldberg | 382/115 |

* cited by examiner

METHOD FOR AUTOMATIC IDENTIFICATION AND DATA CAPTURE

FIELD OF THE INVENTION

The present invention relates to logistics systems and methodologies generally.

BACKGROUND OF THE INVENTION

The following patents and patent applications are believed to represent the current state of the art relevant to the present invention:

U.S. Pat. Nos. 4,044,227; 4,268,179; 4,794,238; 4,844,509; 5,468,949; 5,600,121; 5,621,864; 5,825,012; 5,828,048; 5,828,049; 5,988,508; 5,996,895; 6,070,801; 6,127,928, 6,206,286; 6,252,508; 6,259,408; 6,265,977; 6,283,375; 6,285,342, 6,286,763, 6,317,044.

SUMMARY OF THE INVENTION

The present invention seeks to provide an improved logistics system and methodology There is thus provided in accordance with a preferred embodiment of the present invention a methodology for tracking objects including:

affixing at least one imagable identifier onto each of a multiplicity of objects to be tracked;

imaging at least a portion of at least one of the multiplicity of objects at a known location to provide an at least partial image of the at least one of the multiplicity of objects, containing the at least one imagable identifier; and employing the at least partial image of the object containing the at least one imagable identifier to provide an output indication of the location of the at least one of the multiplicity of objects.

There is also provided in accordance with a preferred embodiment of the present invention an object tracking system including:

at least one imagable identifier affixed onto each of a multiplicity of objects to be tracked;

an imager, imaging at least a portion of at least one of the multiplicity of objects at a known location to provide an at least partial image of the at least one of the multiplicity of objects, containing the at least one imagable identifier; and a processor employing the at least partial image of the object containing the at least one imagable identifier to provide an output indication of the location of the at least one of the multiplicity of objects.

Preferably, the methodology also includes communicating at least one of the at least partial image and the output indication to a remote location.

Affixing preferably includes adhesively attaching the at least one imagable identifier onto a surface of each of the multiplicity of objects. Alternatively or additionally, affixing includes molding the at least one imagable identifier onto a surface of each of the multiplicity of objects. Alternatively or additionally, affixing includes printing the at least one imagable identifier onto a surface of each of the multiplicity of objects.

In accordance with a preferred embodiment of the present invention, the at least one imagable identifier includes a multi-color identifier. Preferably, the at least one imagable identifier includes a multi-segment, multi-color identifier.

In accordance with a preferred embodiment of the present invention, the multi-segment, multi-color identifier is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

More preferably, the multi-segment, multi-color identifier is capable of identifying and distinguishing a plurality of objects at least equal to approximately:

$$\text{Plurality of objects} = n \times (n-1)^{(p-2)} \times (n-2)$$

where n is the number of different colors and p is the number of segments.

In accordance with a preferred embodiment of the present invention, the multi-segment, multi-color identifier has an inherent orientation.

Preferably, imaging includes photographing and may include imaging a plurality of the objects together within a single image. Additionally or alternatively, imaging may include sequentially imaging a plurality of the objects passing a given imaging location Preferably, the at least one imagable identifier includes a plurality of imagable identifiers arranged in at least predetermined propinquity to each other.

In accordance with a preferred embodiment of the present invention, employing the at least partial image of the object containing the at least one imagable identifier includes extracting an identification code from the at least partial image.

Preferably, the object tracking system also includes a communicator, communicating at least one of the at least partial image and the output indication to a remote location In accordance with a preferred embodiment of the present invention, the processor is operative to extract an identification code from the at least partial image.

Preferably, output from the imager of the object tracking system, as well as output from the imaging of the methodology, can be stored for future retrieval.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
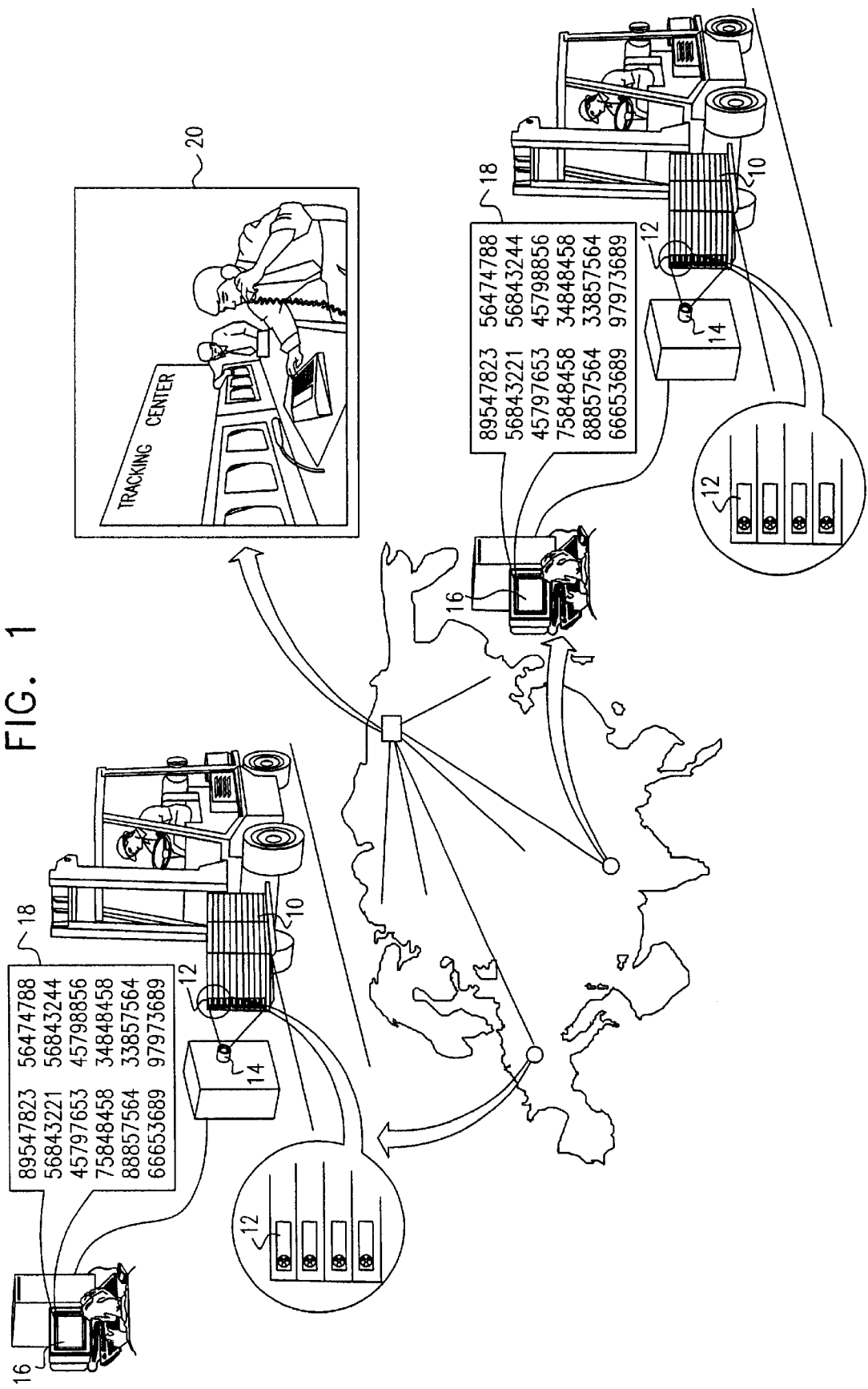
FIG. 1 is a simplified illustration of a multiple location object tracing and tracking system constructed and operative in accordance with a preferred embodiment of the present invention.

Reference is now made to FIG. 1, which is a simplified illustration of a multiple location object tracing and tracking system constructed and operative in accordance with a preferred embodiment of the present invention.

As seen in FIG. 1, there is preferably provided a tracing and tracking system which covers multiple geographically disparate locations at which it is sought to trace and track objects. At typical such locations, such as warehouses, a plurality of objects, such as stacked, collapsed containers 10, each bear an imagable identifier 12. The imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode The identifier is described in the following references, the disclosures of which are hereby incorporated by reference:

U.S. patent application Ser. No. 09/508,300

Published PCT Patent Application WO 00/04711.

It is a particular feature of the present invention that the imagable identifiers on a plurality of objects may be imaged together, as in a single photograph, by a conventional imager 14, such as a digital camera. This is principally due to the fact that the various colors appear in the imagable identifier in two dimensional areas which are relatively easily differentiated from each other both spatially and in color space.

The image output of the imager is preferably provided to a computer 16, which may process the image output locally and provide an output indication 18 representing a plurality of numerical or alphanumerical identifiers corresponding to all of the imagable identifiers imaged in a given image or series of images. Alternatively or additionally, computer 16 may communicate via any suitable computer network, such as the Internet, with a remote tracking center 20, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 16 or in remote tracking center 20.

The remote tracking center 20 preferably compiles records of tracked numerical or alphanumerical identifiers from a multiplicity of geographically disparate locations so as to enable ready counting, tracking and locating of objects identified thereby. Remote tracking center 20 preferably maintains a database which is updated based on communications received from various geographically disparate locations.

Figure 2:
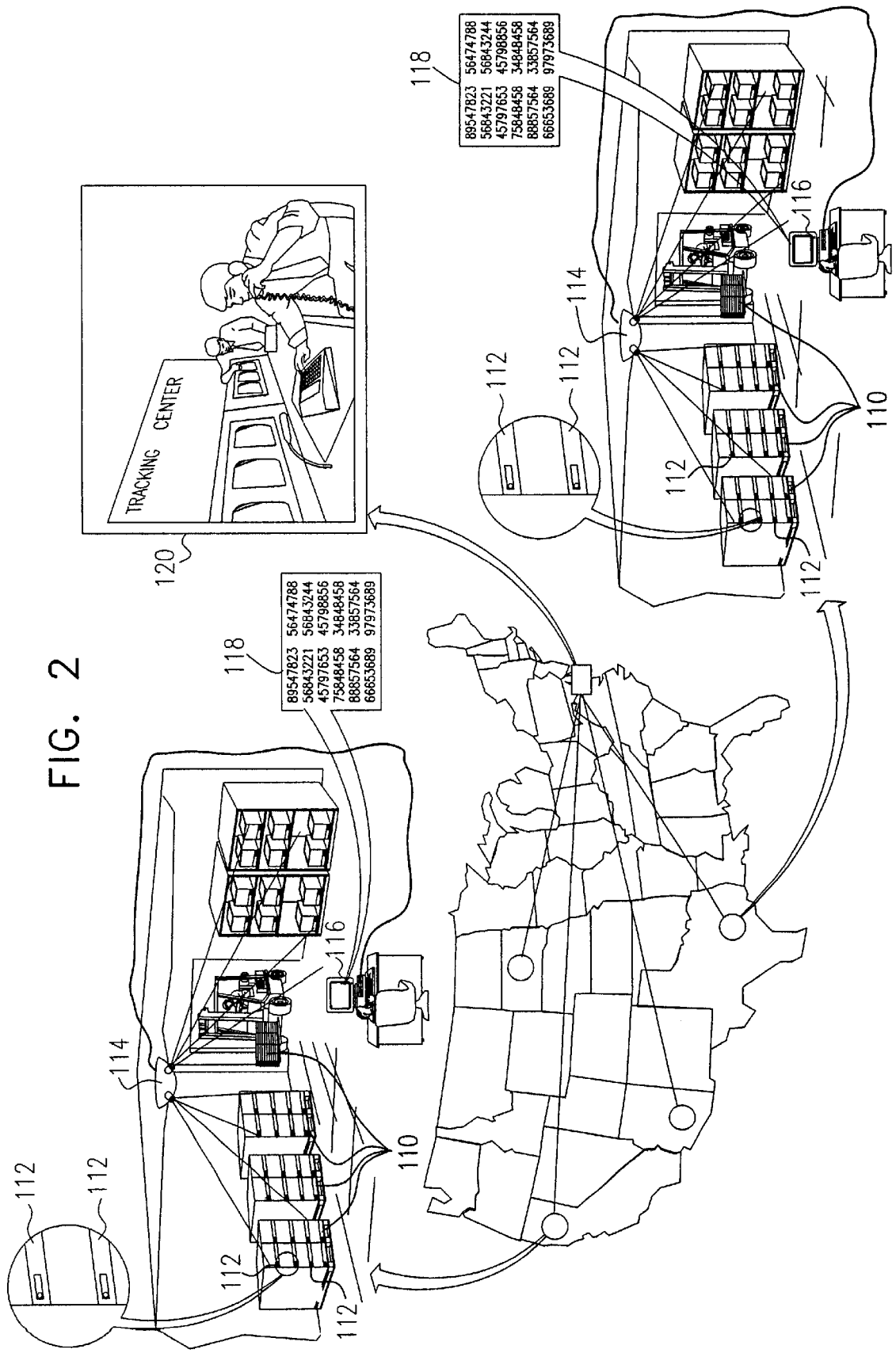
FIG. 2 is a simplified illustration of a multiple location object tracing and tracking system constructed and operative in accordance with another preferred embodiment of the present invention.

Reference is now made to FIG. 2, which is a simplified illustration of a multiple location object tracing and tracking system constructed and operative in accordance with another preferred embodiment of the present invention. As seen in FIG. 2, there is preferably provided a tracing and tracking system which covers multiple geographically disparate locations at which it is sought to trace and track objects. At typical such locations, such as warehouses, a plurality of objects, such as multiple stacks of containers 110 or objects stored on shelves, each bear an imagable identifier 112. The imagable identifier preferably comprises a multi-segment, multi-color identifier preferably in the form of a multi-segment color-coded disc wherein various segments have various colors A preferred imagable identifier is commercially available from ImageID Inc. of One Penn Plaza, Suite 2210, New York, N.Y., U.S.A. under the trade name Imagecode The identifier is described in the following references, the disclosures of which are hereby incorporated by reference:

U.S. patent application Ser. No. 09/508,300

Published PCT Patent Application WO 00/04711.

It is a particular feature of the present invention that the imagable identifiers on a plurality of objects may be automatically imaged together, as in a single photograph or a series of photographs, by a conventional imager 114, such as a panoramic digital camera. This is principally due to the fact that the various colors appear in the imagable identifier in two dimensional areas which are relatively easily differentiated from each other both spatially and in color space.

The arrangement of FIG. 2 is particularly useful for continuously updating inventory records of a large number of objects automatically, without the necessity of approaching each object or stack of objects or moving the objects past a tracking station The image output of the imager is preferably provided to a computer 116 which may process the image output locally and provide an output indication 118 representing a plurality of numerical or alphanumerical identifiers corresponding to all of the imagable identifiers imaged in a given image or series of images. Alternatively or additionally, computer 116 may communicate via any suitable computer network, such as the Internet, with a remote tracking center 120, which may receive either image outputs for processing or alternatively may receive the plurality of numerical or alphanumerical identifiers corresponding to all of the imagable identifiers imaged in a given image or series of images. The image outputs may also be stored for fixture retrieval, either locally in computer 116 or in remote tracking center 120.

The remote tracking center 120 preferably compiles records of tracked numerical or alphanumerical identifiers from a multiplicity of geographically disparate locations so as to enable ready counting, tracking and locating of objects identified thereby. Remote tracking center 120 preferably maintains a database which is updated based on communications received from various geographically disparate locations.

Figure 3:
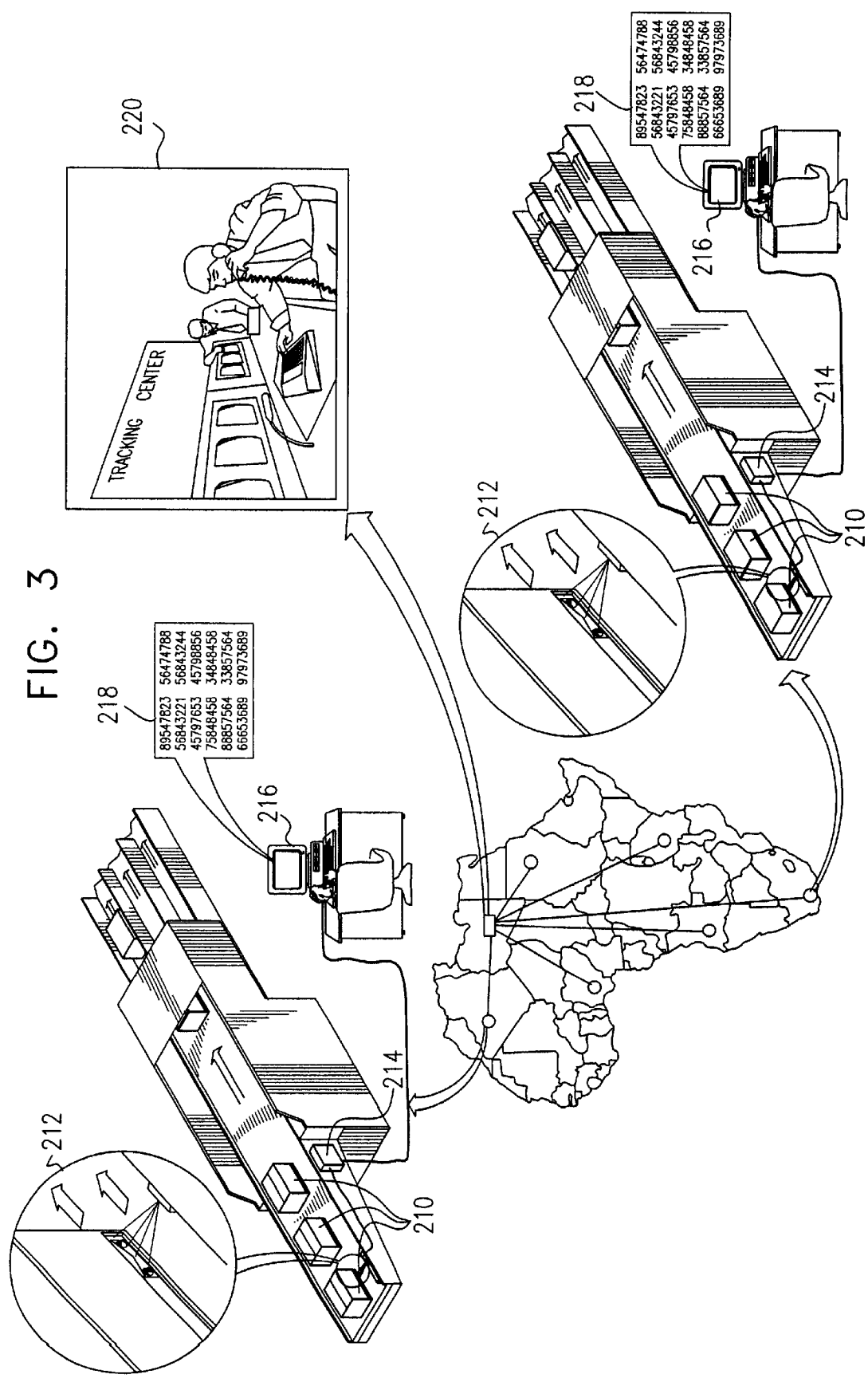
FIG. 3 is a simplified illustration of a multiple location object tracing and tracking system constructed and operative in accordance with yet another preferred embodiment of the present invention.

Reference is now made to FIG. 3, which is a simplified illustration of a multiple location object tracing and tracking system constructed and operative in accordance with yet another preferred embodiment of the present invention. As seen in FIG. 3, there is preferably provided a tracing and tracking system which covers multiple geographically disparate locations at which it is sought to trace and track objects. At typical such locations, such as warehouses, a plurality of objects, such as multiple containers 210, each bear a plurality of imagable identifiers 212. Each imagable identifier preferably comprises a multi-segment, multi-color identifier preferably in the form of a multi-segment color-coded disc wherein various segments have various colors. A preferred imagable identifier is commercially available from ImageID Inc. of One Penn Plaza, Suite 2210, New York, N.Y., U.S.A. under the trade name Imagecode. The identifier is described in the following references, the disclosures of which are hereby incorporated by reference:

U.S. patent application Ser. No. 09/508,300

Published PCT Patent Application WO 00/04711.

It is a particular feature of the present invention that multiple imagable identifiers on one or more objects may be automatically imaged together, as in a single photograph or a series of photographs, by a conventional imager 214, such as a digital camera. This is principally due to the fact that the various colors appear in the imagable identifier in two dimensional areas which are relatively easily differentiated from each other both spatially and in color space.

The arrangement of FIG. 3 is particularly useful for providing a relatively large number of available numerical or alphanumerical identifiers. For example, use of a single Imagecode™ imagable identifier typically provides approximately 60,000 combinations. The use of two Imagecode™ imagable identifiers in a predetermined relative spatial orientation may provide approximately 60,000×60,000 combinations.

The image output of the imager is preferably provided to a computer 216, which may process the image output locally and provide an output indication 218 representing a plurality of numerical or alphanumerical identifiers corresponding to all of the pluralities of imagable identifiers imaged in a given image or series of images. Alternatively or additionally, computer 216 may communicate via any suitable computer network, such as the Internet, with a remote tracking center 220, which may receive either image outputs for processing or alternatively may receive the plurality of numerical or alphanumerical identifiers corresponding to all of the imagable identifiers imaged in a given image or series of images. The image outputs may also be stored for future retrieval, either locally in computer 216 or in remote tracking center 220.

The remote tracking center 220 preferably compiles records of tracked numerical or alphanumerical identifiers from a multiplicity of geographically disparate locations so as to enable ready counting, tracking and locating of objects identified thereby Remote tracking center 220 preferably maintains a database which is updated based on communications received from various geographically disparate locations.

In accordance with a preferred embodiment of the present invention, the multi-segment, multi-color identifier 12, 112 and 212 is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

The foregoing calculation does not assume any predetermined orientation of the imagable identifier.

More preferably, the multi-segment, multi-color identifier is capable of identifying and distinguishing a plurality of objects at least equal to approximately:

$$\text{Plurality of objects} = n \times (n-1)^{(p-2)} \times (n-2)$$

where n is the number of different colors and p is the number of segments.

This calculation assumes a known or constant orientation of the imagable identifier.

Figure 4:
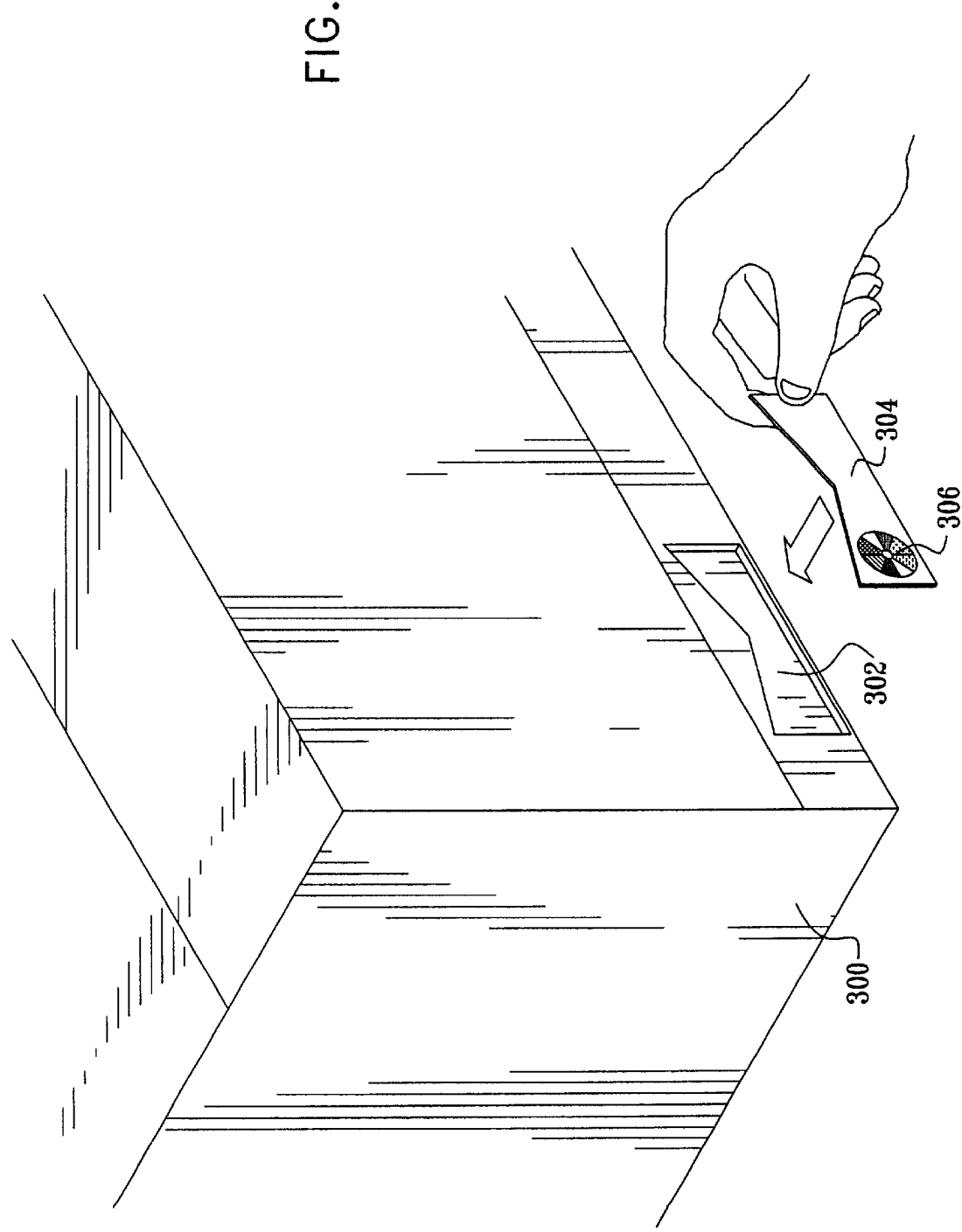
FIG. 4 is an illustration of a methodology for correct affixation of an imagable identifier to an object.

In accordance with a preferred embodiment of the invention, the multi-segment, multi-color identifier has an inherent orientation. It is appreciated that this need not necessarily be the case When the multi-segment, multi-color identifier does not have an inherent orientation, the methodology exemplified in FIG. 4 is particularly useful Reference is now made to FIG. 4, which is an illustration of a methodology for correct affixation of an imagable identifier to an object. It is appreciated that due to the circular symmetry of the Imagecode™ imagable identifier, consistency of affixation orientation is important in order to maximize the number of available combinations of numerical or alphanumerical identifiers while avoiding misidentification of objects.

One technique for ensuring correct affixation orientation is to mold or otherwise form onto a container 300, a three-dimensionally defined affixation location 302 and to provide an imagable identifier carrier 304, such as an adhesive backed sticker, which has a configuration, such as a notched configuration, which allows it to be placed in the three-dimensionally defined affixation location 302 only in one unique orientation relative to the container. Clearly, the structure and methodology shown in FIG. 4 is applicable to imagable identifier carriers 304 which bear multiple as well as single imagable identifiers 306. It is appreciated that other suitable techniques of unique orientation affixation may be employed, such as printing or molding of an imagable identifier directly onto an object.

It is noted that for the sake of clarity, the features of FIGS. 1, 2, 3 and 4 have been described separately. It is to be appreciated that the features of any one or all of FIGS. 1, 2, 3 and 4 may be advantageously combined in a given system or methodology It will be appreciated by persons skilled in the art that the present invention is not limited by what has been particularly shown and described hereinabove. Rather the scope of the present invention includes both combinations and sub-combinations of the various features described hereinabove as well as variations and modifications which would occur to persons skilled in the art upon reading the specification and which are not in the prior art.

What is claimed is:

1. A methodology for tracking objects comprising:

imaging together at a known location a plurality of objects to be tracked, each object having at least one imagable identifier affixed thereto to provide an at least partial image of said pluarlity of said objects, said at least partial image including at least each of said at least one imagable identifiers;

employing said at least partial image to determine an identification code for each of said plurality of objects; and associating each identification code with a known location code.

2. The methodology as in claim 1 further comprising communicating said at least partial image and its associated identification and location codes to a remote location.

3. The methodology as in claim 1 and also comprising storing said at least partial image and its associated identification and location codes.

4. The methodology as in claim 1 wherein said imaging is color imaging.

5. The methodology as in claim 1 wherein said at least one imaginable identifier comprises a multi-color identifier.

6. The methodology as in claim 1 wherein said at least one imagable identifier comprises a multi-segment, multi-color identifier.

7. The methodology as in claim 6 wherein said identifier is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

8. The methodology as in claim 7 wherein said identifier has an inherent orientation.

9. The methodology as in claim 1 wherein said imaging comprises sequentially imaging different pluralities of objects passing a given imaging location.

10. The methodology as in claim 1 wherein said at least one imagable identifier comprises a plurality of imagable identifiers arranged in at least predetermined propinquity to each other.

11. The methodology as in claim 1 wherein said employing comprises extracting said identification code from said at least partial image.

12. The methodology as in claim 1 wherein said identifier has an inherent orientation.

13. An object tracking system comprising:

an imager to image together at a known location a plurality of objects to be tracked each one of said objects having at least one imagable identifier affixed thereto and to provide an at least partial image of said plurality of said objects, said image including at least each of said at least one imagable identifiers;

a processor employing said at least partial image to determine an identification code for each of said plurality of objects and to associate each identification code with a known location code.

14. The system as in claim 13 further comprising a communication unit to communicate said at least partial image and its associated identification and location codes to a remote location.

15. The system as in claim 13 wherein said at least one imagable identifier comprises a multi-color identifier.

16. The system as in claim 13 wherein said at least one imagable identifier comprises a multi-segment, multi-color identifier.

17. The methodology as in claim 16 wherein said multi-segment, multi-color identifier is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

18. The methodology as in claim 17 wherein said multi-segment, multi-color identifier has an inherent orientation.

19. The system as in claim 13 and also comprising a storage unit to store said at least partial image and its associated identification and location codes.

20. The system as in claim 13 and wherein said imager is a color imager.

21. The system as in claim 13 wherein said at least one imagable identifier comprises a plurality of imagable identifiers arranged in at least predetermined propinquity to each other.

22. The system as in claim 13 wherein said identifier has an inherent orientation.

23. A computer-readable medium having computer-executable instructions for performing a methodology for tracking a multiplicity of objects, each of which has an imagable identifier affixed thereto, comprising:
   imaging together at a known location a plurality of said objects to provide an t least partial image of said plurality of said of said objects, said image including said imagable identifier on each of said plurality of objects;
   employing at least partial image to determine an identification code for each of said plurality of said objects; and
   associating each identification code with a known location code.

24. The computer-readable medium as in claim 23 further comprising communicating said at least partial image and its associated identification and location codes to a remote location.

25. The computer-readable medium as in claim 23 wherein said at least one imagable identifier comprises a multi-color identifier.

26. The computer-readable medium as in claim 23 wherein said at least one imagable identifier comprises a multi-segment, multi-color identifier.

27. The computer-readable medium as in claim 26 wherein said multi-segment, multi-color identifier is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

28. The computer-readable medium as in claim 26 wherein said multi-segment, multi-color identifier has an inherent orientation.

29. The computer-readable medium as in claim 26 wherein said imaging comprises sequentially imaging a plurality of said objects passing a given imaging location.

30. The computer-readable medium as in claim 23 wherein said at least one imagable identifier comprises a plurality of imagable identifiers arranged in at least predetermined propinquity of each other.

31. The computer-readable medium as in claim 23 and also comprising storing said at least partial image and its associated identification and location codes.

32. The computer-readable medium as in claim 23 and wherein said imaging is color imaging.

33. The computer-readable medium as in claim 23 wherein said identifier has an inherent orientation.

34. A methodology for tracking objects comprising:
   imaging a first plurality of objects together at a first known location to provide a first at least partial image of said plurality of said objects, each of said objects having at least one imagable identifier affixed thereto with said first image including at least each of said at least one imagable identifiers;
   employing said first at least partial image to determine a first set of identification codes for each of said first plurality of objects;
   associating each of said identification codes of said first set of identification codes with a first known location code;
   imaging a second plurality of objects together at a second known location to provide a second at least partial image of second plurality of said objects, said second image including at least each of said at least one imagable identifiers;
   employing said second at least partial image to determine a second set of identification codes one for each of said second plurality of objects; and
   associating each of said identification codes of said second set of identification codes with a second known location code.

35. The methodology as in claim 34 wherein said imaging of said first plurality of said objects and said imaging of said second plurality of said objects occur at different times.

36. The methodology as in claim 35 wherein an object in said first plurality of objects is also in said second plurality of objects and said associated identification and location codes with respect to said object are first stored and the updated.

37. The methodology as in claim 34 further comprising communicating at least one of said at least partial image and its associated said identification and location codes to a remote location.

38. The methodology as in claim 34 wherein said at least one imagable identifier comprises a multi-color identifier.

39. The methodology as in claim 34 wherein said at least one imagable identifier comprises a multi-segment, multi-color identifier.

40. The methodology as in claim 39 wherein said multi-segment, multi-color identifier is capable of identifying and distinguishing a plurality of objects at least equal to approximately:

$$\text{Plurality of objects} = (n \times (n-1)^{(p-2)} \times (n-2))/p$$

where n is the number of different colors and p is the number of segments.

41. The methodology as in claim 39 wherein said multi-segment, multi-color identifier has an inherent orientation.

42. The methodology as in claim 34 wherein said imaging comprises sequentially imaging a plurality of said objects passing a given imaging location.

43. The methodology as in claim 34 wherein said at least one imagable identifier comprises a plurality of imagable identifiers arranged in at least predetermined propinquity to each other.

44. The methodology as in claim 34 wherein said imaging is color imaging.

45. A method comprising:

generating an image of at least one pallet of objects, each of said objects having at least one imagable identifier affixed thereto; and identifying identification codes embodied in said at least one imagable identifiers from said image.

46. The method according to claim 45 and wherein said imaging occurs at a known location and also comprising generating a tracking indication comprising said identification code and a known location code.

47. The method as in claim 46 and also comprising storing said tracking indication and said image.

48. The method according to claim 46 further comprising communicating at least one of said tracking indication and said image to a remote location.

49. The method as in claim 45 and wherein said imaging is color imaging.

50. The method according to claim 45 wherein said at least one imagable identifier comprises a multi-color identifier.

51. The method according to claim 45 wherein said at least one imagable identifier comprises a multi-color, multi-segment identifier.

52. The method according to claim 45 wherein said at least one imagable identifier has an inherent orientation.

53. The method according to claim 45 and also comprising sequentially imaging different pluralities of objects passing a given imaging location.

54. A method comprising:

having an imaging system with a field of view wide enough to view at least one pallet of objects, each of said objects having associated with it at least one imagable identifier;

imaging said at least one pallet of objects with said imaging system; and using the output of said imaging, identifying identification codes embodied in said at least one imagable identifier.

55. The method according to claim 54 and wherein said imaging occurs at a known location and also comprising generating a tracking indication comprising said identification code and a known location code.

56. The method as in claim 55 and also comprising storing said tracking indication and an at least partial image produced from said imaging.

57. The method according to claim 56 further comprising communicating at least one of said tracking indication and said at least partial image to a remote location.

58. The method as in claim 54 and wherein said imaging is color imaging.

59. The method according to claim 54 wherein said at least one imagable identifier comprises a multi-color identifier.

60. The method according to claim 54 wherein said at least one imagable identifier comprises a multi-color, multi-segment identifier.

61. The method according to claim 54 wherein said at least one imagable identifier has an inherent orientation.

62. The method according to claim 54 and also comprising sequentially imaging different pluralities of objects passing a given imaging location.

63. A bar-code system comprising:

an imaging system with a field of view wide enough to view at least one pallet of objects; and a bar code identification unit operative on an image taken by said imaging system to identify at least a portion of said objects by the bar codes affixed thereon.

64. A system according to claim 63 and wherein said imaging system has a known location and said bar code identification unit comprises a unit to generate a tracking indication comprising said bar code and a known location code.

65. The system according to claim 64 further comprising a communication system to transmit at least one of said tracking indication and said image to a remote location.

66. The system as in claim 64 and also comprising a storage unit to store said tracking indication and said image.

67. The system as in claim 63 and wherein said imaging system is a color imaging system.

68. A bar code reader comprising:

an imager; and an optical system associated with said imager with a field of view wide enough to view at least one pallet of objects, each of said objects having at least one bar codes affixed thereto.

69. The reader according to claim 68 wherein each said at least one bar code comprises a multi-color identifier.

70. The reader according to claim 68 wherein each said at least one bar code comprises a multi-color, multi-segment identifier.

71. The reader according to claim 68 wherein each said at least one bar code has an inherent orientation.

72. The reader as in claim 68 and wherein said imager is a color imager.

* * * * *